United States Patent
Takeda et al.

(10) Patent No.: US 9,883,464 B2
(45) Date of Patent: Jan. 30, 2018

(54) RADIO COMMUNICATION SYSTEM AND USER DEVICE

(71) Applicant: NTT DOCOMO, INC., Tokyo (JP)

(72) Inventors: Kazuaki Takeda, Tokyo (JP); Yusuke Ohwatari, Tokyo (JP); Yousuke Sano, Tokyo (JP); Yukihiko Okumura, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 26 days.

(21) Appl. No.: 14/906,323

(22) PCT Filed: Jul. 22, 2014

(86) PCT No.: PCT/JP2014/069311
§ 371 (c)(1),
(2) Date: Jan. 20, 2016

(87) PCT Pub. No.: WO2015/025664
PCT Pub. Date: Feb. 26, 2015

(65) Prior Publication Data
US 2016/0183199 A1   Jun. 23, 2016

(30) Foreign Application Priority Data
Aug. 19, 2013   (JP) .................................. 2013-169716

(51) Int. Cl.
*G01R 31/08*    (2006.01)
*H04W 52/24*    (2009.01)
(Continued)

(52) U.S. Cl.
CPC ...... *H04W 52/243* (2013.01); *H04B 1/71072* (2013.01); *H04J 11/004* (2013.01);
(Continued)

(58) Field of Classification Search
CPC .................................. H04B 7/216; H04J 3/00
(Continued)

(56) References Cited

U.S. PATENT DOCUMENTS

2017/0163365 A1* 6/2017 Ohwatari .................. H04J 1/06

FOREIGN PATENT DOCUMENTS

| JP | 2012-231218 A | 11/2012 |
| JP | 2013-009291 A | 10/2013 |

OTHER PUBLICATIONS

Office Action issued in the counterpart European Patent Application No. 14837523.1, dated Jul. 1, 2016 (10 pages).
(Continued)

*Primary Examiner* — Iqbal Zaidi
(74) *Attorney, Agent, or Firm* — Osha Liang LLP

(57) ABSTRACT

A user device receives, from a base station, a radio signal in which non-orthogonal signals are mixed. The user device recognizes, based on information transmitted from the base station, a parameter associated with the location of the user device. When the user device is at the edge of the cell area of the base station, a demodulator of the user device demodulates, as a signal directed to the user device, the radio signal in which an interference signal component has been suppressed by an interference rejection combining processor of the user device and a non-orthogonal signal canceller of the user device does not operate. When the user device is within the cell area and is not at the edge of the cell area, until the demodulator demodulates the signal directed to the user device, the interference rejection combining processor suppresses an interference signal component in a non-orthogonal signal outputted from the non-orthogonal signal canceller and the demodulator demodulates the non-or- (Continued)

thogonal signal in which the interference signal component has been suppressed by the interference rejection combining processor.

8 Claims, 8 Drawing Sheets

(51) Int. Cl.
*H04W 52/28* (2009.01)
*H04B 1/7107* (2011.01)
*H04J 11/00* (2006.01)

(52) U.S. Cl.
CPC ......... *H04W 52/28* (2013.01); *H04W 52/283* (2013.01); *H04J 11/005* (2013.01)

(58) Field of Classification Search
USPC .................................................. 370/252–476
See application file for complete search history.

(56) References Cited

OTHER PUBLICATIONS

Kishiyama, Yoshihisa, et al.; "Future Steps of LTE-A: Evolution Toward Integration of Local Area and Wide Area Systems"; IEEE Wireless Communications, IEEE Service Center; vol. 20, No. 1; Piscataway, New Jersey, US; Feb. 1, 2013 (7 pages).

Saito, Yuya et al.; "Non-Orthogonal Multiple Access (NOMA) for Cellular Future Radio Access"; 2013 IEEE 77th Vehicular Technology Conference (VTC Spring); Jun. 2, 2013 (5 pages).
Sharp Corporation; Evolving RAN Towards Rel-12 and Beyond; 3GPP RAN Workshop on Release 12 Oward, RWS-120039; Ljubljana, Slovenia; Jun. 11-12, 2012 (11 pages).
NTT Docomo, Inc.; "Requirements, Candidate Solutions & Technology Roadmap for LTE Rel-12 Onward"; 3GPP Workshop on Release 12 and onwards, RWS-120010; Ljubljana, Slovenia; Jun. 11-12, 2012 (27 pages).
International Search Report issued in application No. PCT/JP2014/069311 dated Sep. 22, 2014 (2 pages).
Yoshihisa Kishiyama, et al.; "Initial Views on Non-orthogonal Multiple Access Based Radio Interface for Future Radio Access"; IEICE Technical Report, vol. 111, No. 145, pp. 37-42; Jul. 2011 (8 pages).
Souvik Sen, et al.; "Successive Interference Cancellation: A Back-of-the-Envelope Perspective"; Proc. Ninth ACM Workshop on Hot Topics in Networks (HotNets-IX), Monterey, CA, Oct. 20-21, 2010 (6 pages).
Raphaël Visoz, et al.; "Binary Versus Symbolic Performance Prediction Methods for Iterative MMSE-IC Multiuser MIMO Joint Decoding"; Proc. IEEE SPAWC, Jun. 2009; pp. 131-135 (5 pages).
Notification of Reasons for Refusal issued in the counterpart Japanese Patent Application No. 2013-169716, dated May 30, 2017 (6 pages).

* cited by examiner

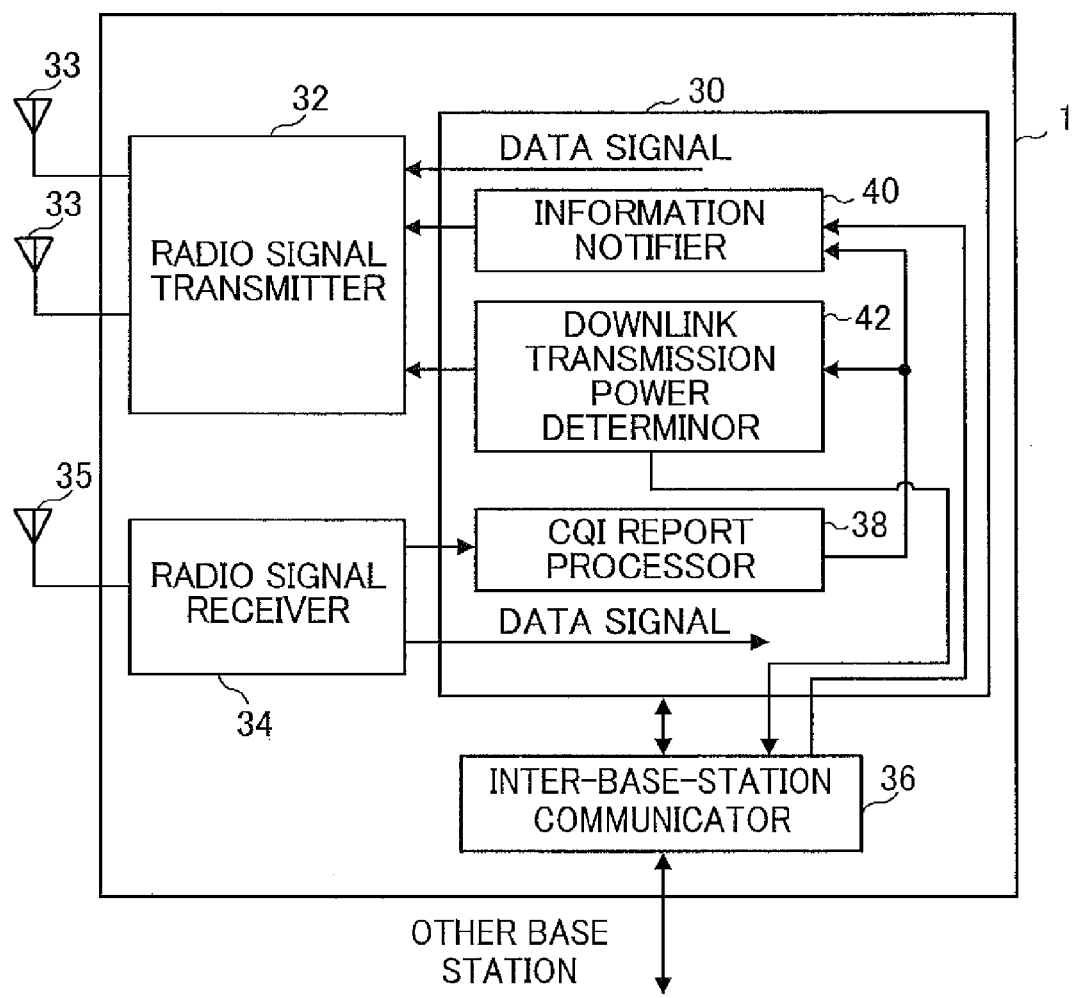

RADIO COMMUNICATION SYSTEM AND USER DEVICE

TECHNICAL FIELD

The present invention relates to a radio communication system and to a user device.

BACKGROUND ART

In mobile communication networks, orthogonal multiple access, in which signals do not interfere with each other, is widely used for communication between base stations and user devices (e.g., mobile stations). In orthogonal multiple access, different radio resources are allocated to different user devices. Examples of orthogonal multiple access include CDMA (code division multiple access), TDMA (time division multiple access), and OFDMA (orthogonal frequency division multiple access). For example, Long Term Evolution (LTE), which is standardized by the 3GPP, uses OFDMA for downlink communication. In OFDMA, different frequencies are allocated to different user devices.

Non-orthogonal multiple access (NOMA) has been proposed as a scheme for communication between base stations and user devices (e.g., see Patent Document 1). In non-orthogonal multiple access, the same radio resource is allocated to different user devices. More specifically, a single frequency is simultaneously allocated to different user devices. When non-orthogonal multiple access is applied to downlink communication, a base station transmits a signal with high transmission power to a user device with large path loss or low reception SINR (signal-to-interference plus noise power ratio) (that is, in general, a user device located at the edge of a cell area). To a user device with small path loss or high reception SINR (that is, in general, a user device located in the center of the cell area), the base station transmits a signal with low transmission power. Signals to be received by each user device are therefore subject to interference from signals directed to other user devices.

In this case, each user device utilizes a power difference to demodulate a signal directed to the user device. Specifically, each user device first demodulates a signal having the highest reception power. Since the demodulated signal is a signal directed to a user device that is located at the farthest edge of the cell area or that is with the lowest reception SINR, the user device located at the farthest edge of the cell area or with the lowest reception SINR finishes demodulation. Each of the other user devices uses an interference canceller to eliminate, from the received signals, an interfering component corresponding to the demodulated signal. Each of the other user devices then demodulates a signal having the second highest reception power. Since the demodulated signal is a signal directed to a user device that is located at the second farthest edge of the cell area or that is with the second lowest reception SINR, the user device located at the second farthest edge of the cell area or with the second lowest reception SINR finishes demodulation. By repeating demodulation and elimination of high-power signals as described above, every user device can demodulate a signal directed to its own device.

A combination of non-orthogonal multiple access with orthogonal multiple access can increase the capacity of a mobile communication network in comparison with the use of orthogonal multiple access alone. That is, while the use of orthogonal multiple access alone does not allow simultaneous allocation of a radio resource (e.g., a frequency) to multiple user devices, a combination of non-orthogonal multiple access and orthogonal multiple access will allow simultaneous allocation of a radio resource to multiple user devices.

In LTE Advanced, a technique for reception by mobile communication terminals, which is called interference rejection combining, is discussed (e.g., see Patent Document 2). Interference rejection combining (IRC) is a technique for downlink communication in which a user device assigns weights to signals captured by receiving antennae so as to suppress interference, to a desired radio beam from a serving base station (desired base station), from an interfering radio beam from an interfering base station. IRC particularly improves the reception quality of a desired signal carried on a desired radio beam when a user device is located near a boundary of a serving cell area (i.e., a cell area of a desired base station) and is subject to a strong interfering radio beam from another base station (interfering base station) adjacent to the desired base station.

RELATED ART DOCUMENTS

Patent Documents

Patent Document 1: Japanese Patent Application Laid-Open Publication No. 2013-009291
Patent Document 2: Japanese Patent Application Laid-Open Publication No. 2012-231218

SUMMARY OF THE INVENTION

Problem to be Solved by the Invention

The inventors think that it is possible for a user device to execute interference rejection combining in a communication system in which non-orthogonal multiple access is used for downlink communication. However, no radio communication system has been proposed that uses non-orthogonal multiple access and in which a user device can execute interference rejection combining and can appropriately process radio signals that include non-orthogonal signals.

The present invention therefore provides: a radio communication system that uses non-orthogonal multiple access and in which a user device can execute interference rejection combining and can appropriately process radio signals that include non-orthogonal signals; and a user device therefor.

Means of Solving the Problems

A radio communication system according to an aspect of the present invention includes base stations and user devices. Each base station includes: a downlink transmission power determiner that determines, according to parameters associated with locations of user devices that are connected to the base station, downlink transmission power for downlink transmission to each of these user devices connected to the base station; a radio signal transmitter that transmits a radio signal in which non-orthogonal signals that are not orthogonal to each other are mixed, each of the non-orthogonal signals being transmitted with the corresponding downlink transmission power determined by the downlink transmission power determiner, each of the non-orthogonal signals being directed to a corresponding one of the user devices connected to the base station; and an information notifier that notifies each of the user devices connected to the base station of information associated with at least one of a location of the user device and the downlink transmission power for the user device. Each user device includes: a radio signal receiver that receives, from a desired base station to which the user device is connected, a radio signal including non-orthogonal signals that are not orthogonal to each other, an interference rejection combining processor that suppresses an interference signal component received from an interfering base station to which the user device is not connected, the interference signal component being in a non-orthogonal signal in the radio signal received by the radio signal receiver, a demodulator that demodulates the non-orthogonal signal in which the interference signal component has been suppressed by the interference rejection combining processor; a location recognizer that recognizes, based on the information transmitted from the desired base station, a parameter associated with the location of the user device; and a non-orthogonal signal canceller that, in a case in which the location recognizer recognizes that the user device is located within a cell area of the desired base station and is not located nearest to a boundary of the cell area, cancels, from the radio signal, the non-orthogonal signal demodulated by the demodulator. In a case in which the location recognizer recognizes that the user device is located within the cell area of the desired base station and is located nearest to the boundary of the cell area, the demodulator demodulates, as a signal directed to the user device, the radio signal in which the interference signal component has been suppressed by the interference rejection combining processor, and the non-orthogonal signal canceller does not operate. In a case in which the location recognizer recognizes that the user device is located within the cell area of the desired base station and is not located nearest to the boundary of the cell area, until the demodulator demodulates the signal directed to the user device, the interference rejection combining processor suppresses an interference signal component in a non-orthogonal signal outputted from the non-orthogonal signal canceller and the demodulator demodulates the non-orthogonal signal in which the interference signal component has been suppressed by the interference rejection combining processor.

A user device according to an aspect of the present invention communicates with a desired base station. The user device includes: a radio signal receiver that receives, from the desired base station, a radio signal in which non-orthogonal signals that are not orthogonal to each other are mixed, each of the non-orthogonal signals being directed to a corresponding one of user devices that are connected to the desired base station, the non-orthogonal signals being different in power according to parameters associated with locations of these user devices connected to the desired base station; an interference rejection combining processor that suppresses an interference signal component received from an interfering base station to which the user device is not connected, the interference signal component being in a non-orthogonal signal in the radio signal received by the radio signal receiver; a demodulator that demodulates the non-orthogonal signal in which the interference signal component has been suppressed by the interference rejection combining processor; a location recognizer that recognizes, based on information transmitted from the desired base station, a parameter associated with a location of the user device, the information being associated with at least one of the location of the user device and downlink transmission power for the user device; and a non-orthogonal signal canceller that, in a case in which the location recognizer recognizes that the user device is located within a cell area of the desired base station and is not located nearest to a boundary of the cell area, cancels, from the radio signal, the non-orthogonal signal demodulated by the demodulator. In a case in which the location recognizer recognizes that the user device is located within the cell area of the desired base station and is located nearest to the boundary of the cell area, the demodulator demodulates, as a signal directed to the user device, the radio signal in which the interference signal component has been suppressed by the interference rejection combining processor, and the non-orthogonal signal canceller does not operate. In a case in which the location recognizer recognizes that the user device is located within the cell area of the desired base station and is not located nearest to the boundary of the cell area, until the demodulator demodulates the signal directed to the user device, the interference rejection combining processor suppresses an interference signal component in a non-orthogonal signal outputted from the non-orthogonal signal canceller and the demodulator demodulates the non-orthogonal signal in which the interference signal component has been suppressed by the interference rejection combining processor.

Effects of the Invention

In the present invention, the user device recognizes, based on information that is transmitted from the desired base station and is associated with at least one of the location of the user device and the downlink transmission power for the user device, a parameter associated with the location of the user device. When the location recognizer recognizes that the user device is within the cell area of the desired base station and is nearest to the boundary of the cell area, the demodulator demodulates, as a signal directed to the user device, the radio signal in which the interference signal component has been suppressed by the interference rejection combining processor, and the non-orthogonal signal canceller does not operate. That is, in this case, the user device executes interference rejection combining, and the user device demodulates the radio signal without cancelling a non-orthogonal signal directed to another user device connected to the desired base station.

When the location recognizer recognizes that the user device is within the cell area of the desired base station and is not located nearest to the boundary of the cell area, the interference rejection combining processor of the user device suppresses an interference signal component that is in the radio signal and is received from an interfering base station, the demodulator demodulates a non-orthogonal signal in which the interference signal component has been suppressed by the interference rejection combining processor, and the non-orthogonal signal canceller cancels, from the radio signal, the non-orthogonal signal demodulated by the demodulator. Until the demodulator demodulates a signal directed to the user device, the interference rejection combining processor suppresses an interference signal component in a non-orthogonal signal outputted from the non-orthogonal signal canceller, and the demodulator demodulates the non-orthogonal signal in which the interference signal component has been suppressed by the interference rejection combining processor. That is, in this case, the user device repeats interference rejection combining and cancellation of a non-orthogonal signal directed to another user device connected to the desired base station, until the demodulator demodulates the signal directed to the user device.

As described above, the present invention achieves non-orthogonal multiple access in which a user device can execute interference rejection combining and appropriately process a radio signal that includes non-orthogonal signals. In particular, based on information transmitted from a desired base station, the user device can recognize a parameter associated with the location of the user device, and based on the parameter associated with the location, the user device can selectively execute interference rejection combining and appropriate processes for demodulation of a non-orthogonal signal.

BRIEF DESCRIPTION OF THE DRAWINGS

FIG. 11 is a block diagram illustrating a configuration of a base station according to a fifth embodiment of the present invention.

MODES FOR CARRYING OUT THE INVENTION

Various embodiments of the present invention are described below with reference to the accompanying drawings.

First, a brief description of non-orthogonal multiple access will be given.

Figure 1:
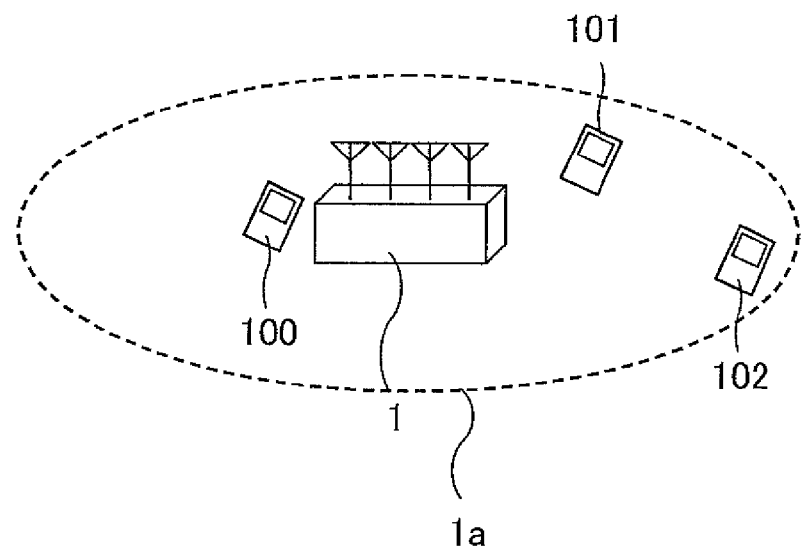
FIG. 1 is a schematic diagram illustrating a base station and user devices to provide a brief description of non-orthogonal multiple access.

As illustrated in FIG. 1, a base station 1 communicates with user devices (i.e., pieces of user equipment or UE) 100 to 102. In FIG. 1, reference sign 1a denotes a cell area of the base station 1. The UE 102 is located at the edge of the cell area, that is, nearest the boundary of the cell area 1a. The UE 102 is farthest away from the base station 1 and has the greatest path loss (or the lowest reception SINR). The UE 100 is located near the center of the cell area 1a. The UE 100 is nearest to the base station 1 and has the smallest path loss (or the highest reception SINR). The UE 101 is nearer to the base station 1 than the UE 102 and farther away from the base station 1 than the UE 100.

Figure 2:
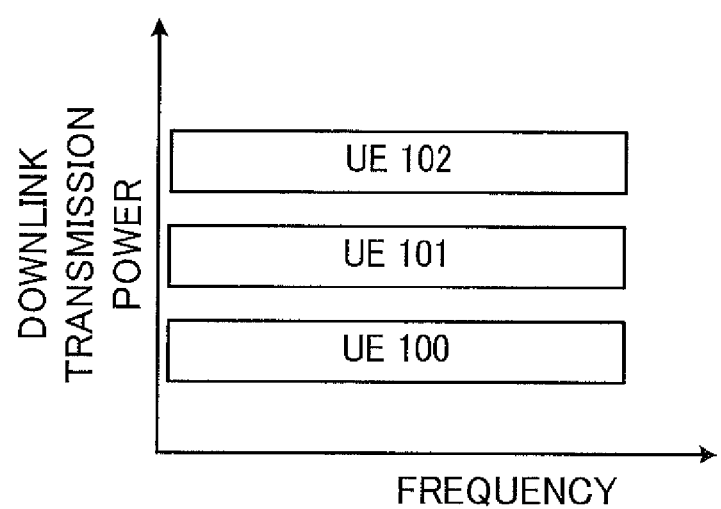
FIG. 2 is a diagram illustrating an example of allocation of downlink transmission power by the base station to each user device in non-orthogonal multiple access.

FIG. 2 is a diagram illustrating an example of downlink transmission power allocation to each UE by a base station in non-orthogonal multiple access. The base station 1 performs downlink transmission to the UEs 100 to 102 by simultaneously using the same frequency. That is, the same frequency and the same time are allocated to the UEs 100 to 102. The base station 1 uses the highest downlink transmission power for transmission to the UE 102, which is located farthest away from the base station 1. The base station 1 uses the lowest downlink transmission power for transmission to the UE 100, which is located nearest to the base station 1.

UEs that are connected to the base station 1 are not limited to the UEs. 100 to 102. Non-orthogonal multiple access can be combined with orthogonal multiple access, and a frequency that is different from the frequency allocated to the UEs 100 to 102 may be allocated to UEs other than the UEs 100 to 102. The number of UEs to which the same frequency is simultaneously allocated (i.e., the number of UEs multiplexed in NOMA) is not limited to 3; it may be 2, 4, or more than 4.

From the standpoint of each of the UEs 100 to 102, a signal having the highest reception power is a signal directed to the UE 102 and a signal having the lowest reception power is a signal directed to the UE 100. Each of the UEs 100 to 102 first demodulates the signal having the highest reception power. Since the demodulated signal is a signal directed to the UE 102, which is located nearest to the boundary of the cell area 1a, the UE 102 finishes demodulation and uses the demodulated signal. Each of the other UEs 100 and 101 eliminates an interfering component corresponding to the demodulated signal from the received signal using an interference canceller and demodulates a signal having the second highest reception power. Since the demodulated signal is a signal for the UE 101, which is located second nearest to the boundary of the cell area 1a, the UE 101 finishes demodulation and uses the demodulated signal. By thus repeating demodulation and elimination of signals having high reception power, every one of the UEs 100 to 102 can demodulate a signal directed to its own UE. As described above, in non-orthogonal multiple access, a UE cancels a signal that is transmitted from the desired base station 1 to another UE until the UE demodulates a signal directed to the UE.

Figure 3:
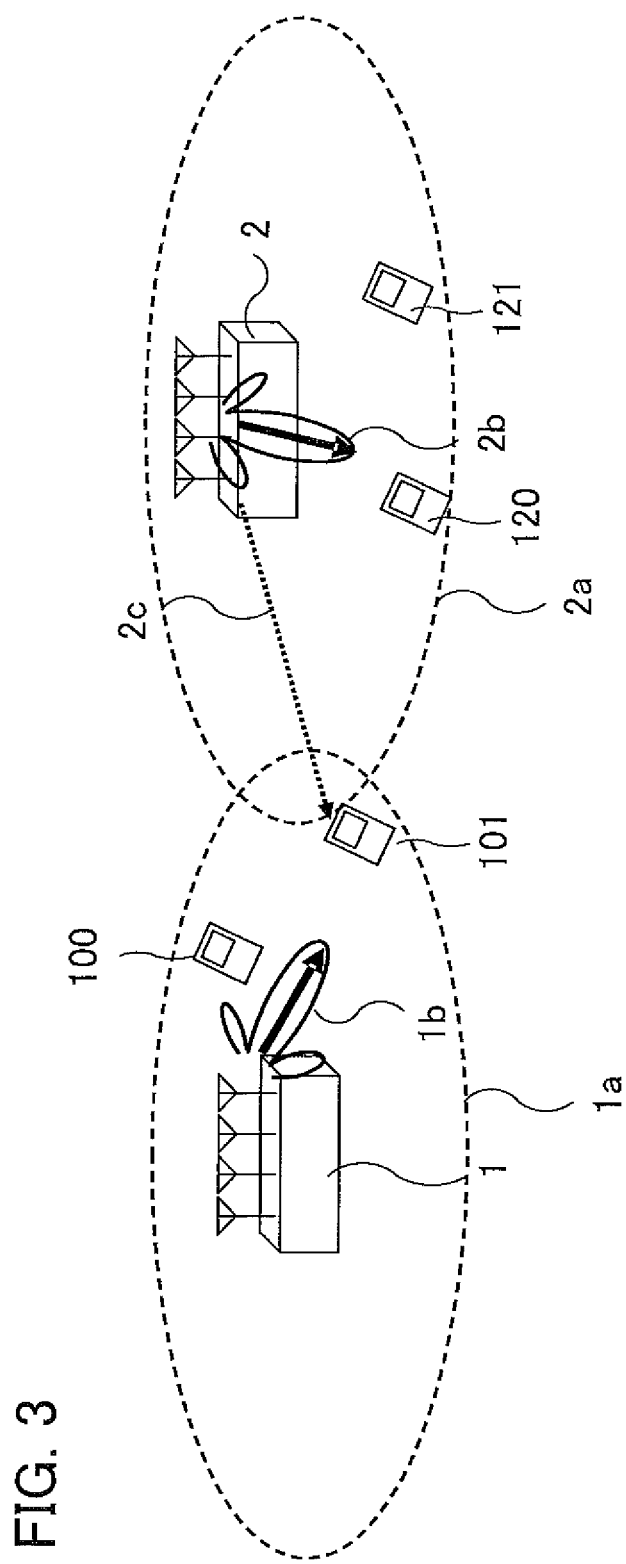
FIG. 3 is a schematic diagram illustrating a radio communication system to which the present invention is applied.

Next, interference rejection combining is described with reference to FIG. 3. As illustrated in FIG. 3, a radio communication network includes base stations 1 and 2. The base station 1 communicates with UEs 100 and 101, and the base station 2 communicates with UEs 120 and 121. In FIG. 3, reference sign 2a denotes a cell area of the base station 2. Radio waves that are received from the desired base station 1 by the UEs connected to the base station 1 are subject to interference from radio waves that are transmitted from the base station 2 and are of the same frequency. Radio waves that are received from the desired base station 2 by the UEs connected to the base station 2 are subject to interference from radio waves that are transmitted from the base station 1 and are of the same frequency. In particular, a UE located near a boundary of a cell area of a desired base station is susceptible to an interfering radio beam from another base station adjacent to the desired base station. For example, the UE 101, which is located near the boundary of the serving cell area (i.e., the cell area of the desired base station 1) 1a, is highly susceptible to an interfering radio beam from the other base station 2 (interfering base station), which is adjacent to the desired base station 1. FIG. 3 schematically illustrates the shape of a beam 1b generated by the desired base station 1 and the shape of a beam 2b generated by the interfering base station 2. A portion of the beam 2b generated by the interfering base station 2, i.e., the beam for a downlink channel to another UE (e.g., the UE 120), can become a cause of an interference signal 2c to the UE 101.

Interference rejection combining is a technique in which a UE calculates a weighting coefficient (reception weight) using an MMSE (minimum mean square error) algorithm, applies the reception weight to each signal that is received by each receiving antenna of the UE, and thereby cancels an interference signal transmitted from an interfering base station. Procedures for interference rejection combining have already been proposed and are publicly known.

The present invention relates to a radio communication system, such as that illustrated in FIG. 3, which includes base stations and multiple UEs. In particular, the present invention relates to a radio communication system to which non-orthogonal multiple access (NOMA) is applied and in which each UE can execute interference rejection combining (IRC) and appropriately process a radio signal that includes non-orthogonal signals.

Next, an example is described of a technique for determining downlink transmission power for each UE by a base station in NOMA. The base station determines downlink transmission power $P_k$ for each UE using, for example, Formula (1) below.

$$P_k = \frac{P}{\sum_{i=1}^{K}(|h_i|^2/N_i)^{-\alpha}}\left(\frac{|h_k|^2}{N_k}\right)^{-\alpha} \quad (1)$$

In Formula 1, P is the sum of downlink transmission power to all UEs that simultaneously use the same frequency (total downlink transmission power). The subscript k of each parameter identifies a UE for which the downlink transmission power $P_k$ is determined, and the subscript i of each parameter identifies a UE in summation in Formula (1). The term K is the number of UEs that simultaneously use the same frequency. The term h indicates a downlink channel coefficient for a UE, and N indicates a sum of thermal noise power and interfering power from another base station at each UE.

$$\frac{|h_i|^2}{N_i}$$

corresponds to an SINR (signal-to-interference plus noise power ratio) at a $UE_i$. The base station can find out the SINR from a CQI (channel quality indicator) that is reported from the $UE_i$. In Formula (1), $\alpha$ is a coefficient for determining the allocation of downlink transmission power. The term $\alpha$ is greater than 0 and is equal to or less than 1. If $\alpha$ is 0, equal downlink transmission power is allocated to all UEs that simultaneously use the same frequency. Since $\alpha$ is greater than 0 and is equal to or less than 1, low downlink transmission power is allocated to a UE with a high SINR (i.e., a UE with good reception quality). As $\alpha$ approaches 1, differences in transmission power for UEs increase with respect to differences in reception SINRs among the UEs.

The following describes a scheme for demodulating a radio signal at each UE in the communication system illustrated in FIG. 3 in which each UE executes IRC and to which NOMA is applied. The UEs 100 and 101, which are connected to the base station 1, are used as an example.

Because the UE 100 is located near the base station 1, the UE 100 is subject to interference from a signal directed to another UE in NOMA more strongly than to inter-cell interference, i.e., interference from the other base station 2. Because the UE 101 is located in the cell area of the base station 1 and is near the boundary of the cell area, the UE 101 is subject to inter-cell interference more strongly than to interference from a signal directed to another UE in NOMA.

It is therefore desirable that UEs perform demodulation according to different schemes depending on the locations of the UEs within a cell area of a base station. However, as is evident from the description of the technique for determining downlink transmission power in NOMA, power in NOMA depends on the reception SINR (reception quality) at each UE. Downlink transmission power for a UE located far away from a desired base station is therefore not necessarily high, and downlink transmission power for a UE located near a desired base station is not necessarily low. Although an SINR is a parameter associated with location, the SINR does not completely depend on location. The "location" of a UE described in this specification is therefore a location based on an SINR (reception quality), and the distance between a UE and a desired base station is a distance based on an SINR (reception quality). That is, by saying that a UE is located near a boundary of a cell area (or is located far away from a desired base station), a reception SINR (reception quality) at the UE is meant to be low, and by saying that a UE is near a desired base station, a reception SINR (reception quality) at the UE is meant to be high. For brevity, the two UEs 100 and 101 connected to the base station 1 are assumed to be simultaneously allocated with the same downlink frequency according to NOMA.

Figure 4:
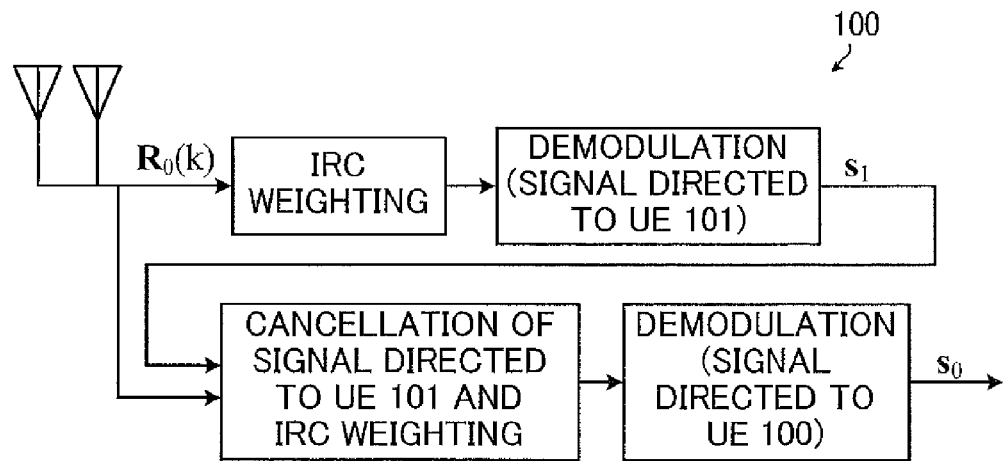
FIG. 4 is a block diagram illustrating functional blocks, in a user device located nearest a base station in the radio communication system to which the present invention is applied, for demodulating a signal directed to the user device.

FIG. 4 is a block diagram illustrating functional blocks for procedures from reception of a radio signal by the UE 100 located nearest the base station 1 to demodulation of a signal directed to the UE 100. As illustrated in FIG. 4, the UE 100 first IRC-weights received signals $R_0(k)$ received by the antennae and then demodulates, from the IRC-weighted received signals, a signal $s_1$ that is directed to the UE 101 (i.e., a signal with the highest reception power).

Next, the UE 100 cancels the signal directed to the UE 101 from the received signals received by the antennae, IRC-weights the obtained signals, and then demodulates, from the IRC-weighted signals, a signal so that is directed to the UE 100 (i.e., a signal with the lowest reception power).

Figure 5:
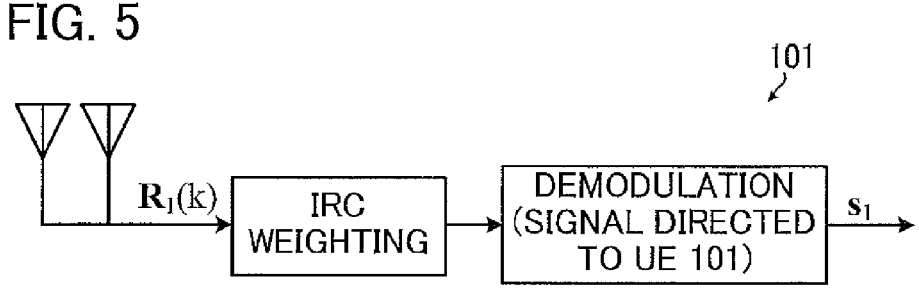
FIG. 5 is a block diagram illustrating functional blocks, in a user device located farthest away from a base station in the radio communication system to which the present invention is applied, for demodulating a signal directed to the user device.

FIG. 5 is a block diagram illustrating functional blocks for procedures from reception of a radio signal by the UE 101 located farthest away from the base station 1 (i.e., located nearest the boundary of the cell area) to demodulation of a signal directed to the UE 101. As illustrated in FIG. 5, the UE 101 first IRC-weights received signals $R_1(k)$ received by the antennae and then demodulates, from the IRC-weighted received signals, a signal $s_1$ directed to the UE 101 (i.e., a signal with the highest reception power).

Although the number of UEs to which the same frequency is simultaneously allocated (i.e., the number of UEs that are multiplexed in NOMA) is assumed to be 2 in the foregoing, the number of UEs is not limited to 2 and may be 3 or more. A UE located near a base station repeats demodulation of a signal with reception power higher than reception power for a signal directed to the UE, cancellation of the demodulated signal, and IRC weighting, until the signal directed to the UE is demodulated.

As described above, in the communication system in which each of the UEs executes IRC and to which NOMA is applied, it is desirable that the UEs perform demodulation according to different schemes depending on the locations of the UEs within the cell area of the base station. Therefore, it is desirable that each UE recognize a parameter associated with the relative location of the UE within the cell area of the base station.

First Embodiment

Figure 6:
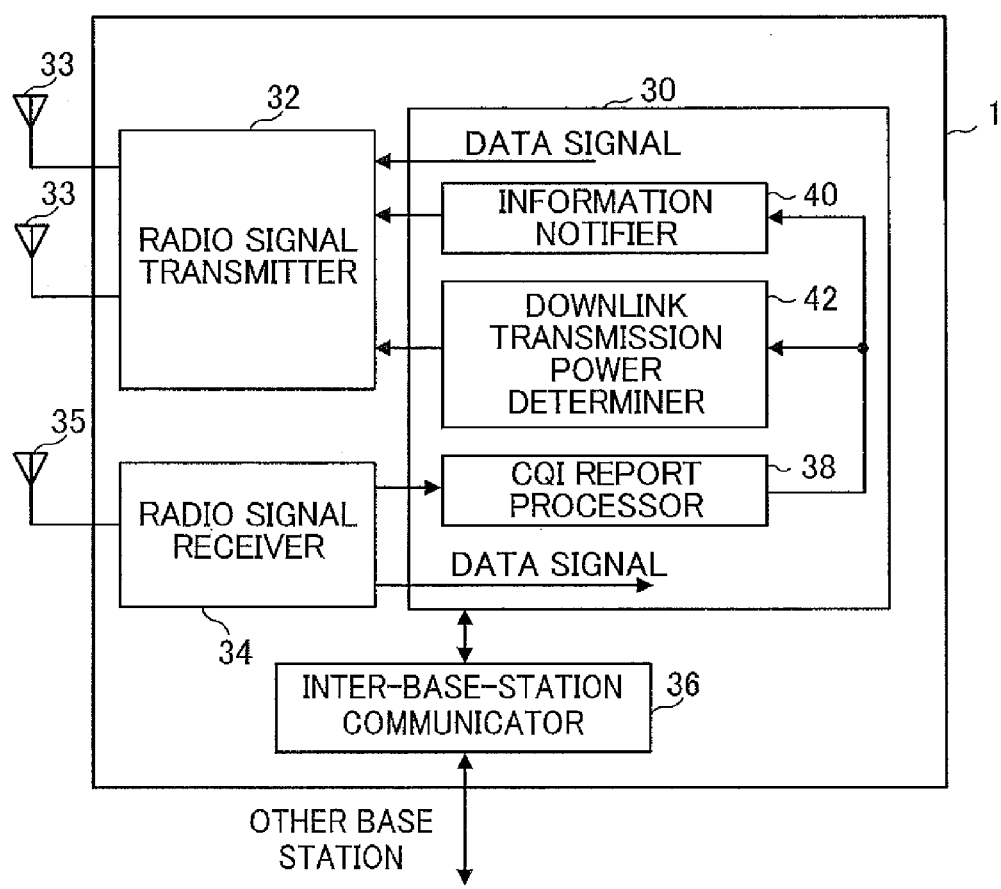
FIG. 6 is a block diagram illustrating a configuration of a base station according to a first embodiment of the present invention.

FIG. 6 is a block diagram illustrating a configuration of a base station 1 according to a first embodiment of the present invention. A base station 2 has a configuration similar to the configuration of the base station 1. The base station 1 includes a controller 30, a radio signal transmitter 32, transmitting antennae 33, a radio signal receiver 34, a receiving antenna 35, and an inter-base-station communicator 36.

The radio signal transmitter 32 is a transmitting circuit that converts electrical signals into radio waves transmitted from the transmitting antennae 33 in order for the base station 1 to perform radio transmission to each UE. The transmitting antennae 33 constitute an adaptive antenna array. The radio signal receiver 34 is a receiving circuit that converts radio waves received from the receiving antenna 35 into electrical signals in order for the base station 1 to perform radio reception from each UE. The inter-base-station communicator 36 is a communication interface via which the base station 1 communicates with another base station.

The controller 30 includes a CQI report processor 38, an information notifier 40, and a downlink transmission power determiner 42. The controller 30 is a CPU (central processing unit) that operates in accordance with a computer program. The CQI report processor 38, the information notifier 40, and the downlink transmission power determiner 42 are functional blocks that are achieved by the controller 30 functioning in accordance with the computer program.

The controller 30 processes an uplink data signal that is transmitted from each UE connected to the base station 1 and is received by the radio signal receiver 34.

The CQI report processor 38 recognizes an SINR at each UE based on a CQI (channel quality indicator) that is reported from each UE connected to the base station 1 and is received by the radio signal receiver 34. Based on the SINR of each UE, the downlink transmission power determiner 42 determines, for NOMA, downlink transmission power that is used for downlink transmission to each UE connected to the base station 1. The SINR is a parameter associated with the relative location of the UE within the cell area; specifically, the SINR is a parameter associated with the distance between the UE and the base station. The technique for determining downlink transmission power is described above with reference to Formula (1). Note, however, that Formula (1) is a mere example, and the technique for determining downlink transmission power is not limited to Formula (1). The greater the distance between the UE and the base station, the higher downlink transmission power the downlink transmission power determiner 42 allocates to the UE.

The controller 30 supplies downlink data signals to the radio signal transmitter 32, each of which is directed to a corresponding one of the UEs connected to the base station 1. The radio signal transmitter 32 transmits, through the transmitting antennae 33, a radio signal in which non-orthogonal signals (corresponding to the downlink data signals) that are not orthogonal to each other are mixed. Each of the non-orthogonal signals is directed to the corresponding one of the UEs connected to the base station 1. Here, the radio signal transmitter 32 transmits each of the non-orthogonal signals with the corresponding downlink transmission power determined by the downlink transmission power determiner 42. Accordingly, the data signals are transmitted with different levels of downlink transmission power to the UEs with which the same frequency is simultaneously used for downlink transmission.

The information notifier 40 notifies each of the UEs connected to the base station 1 of information indicating the location of the UE. The "location of the UE" as used herein is the relative location of the UE within the cell area; specifically, the "location of the UE" is a level of distance between the UE and the desired base station. The information notifier 40 notifies a UE of information indicating a level of distance between the UE and the desired base station through an upper-layer signal or a control channel signal.

For example, the information notifier 40 can use, as the information indicating a level of distance between a UE and the desired base station, a predetermined number of bits in a control channel. Table 1 shows an example of the information indicating a level of distance between a UE and the desired base station.

TABLE 1

| BIT FIELD | INTERPRETATION |
|---|---|
| 00 | NEAREST TO CELL AREA BOUNDARY |
| 01 | SECOND NEAREST TO CELL AREA BOUNDARY |
| 10 | SECOND NEAREST TO BASE STATION |
| 11 | NEAREST TO BASE STATION |

Table 1 shows an example of a case in which the number of UEs to which the same frequency is simultaneously allocated (i.e., the number of UEs that are multiplexed in NOMA) is 4. Each of the UEs can recognize the location of that UE with respect to the desired base station by interpreting two bits in a downlink control channel. In Table 1, the two-bit value 00 indicates that the UE is the nearest to the boundary of the cell area (cell area boundary), and the two-bit value 11 indicates that the UE is the nearest to the base station. The relationship between the bit values and the interpretations, however, is not limited to this example.

The number of UEs that are multiplexed in NOMA is not limited to 4. There can be different variations in the information indicating a level of distance between a UE and the desired base station. For example, in a case in which the number of UEs that are multiplexed in NOMA is 2, two-bit information as shown in Table 2 or one-bit information as shown in Table 3 may be used.

TABLE 2

| BIT FIELD | INTERPRETATION |
|---|---|
| 00 | NEAREST TO CELL AREA BOUNDARY |
| 11 | NEAREST TO BASE STATION |

TABLE 3

| BIT FIELD | INTERPRETATION |
|---|---|
| 0 | NEAREST TO CELL AREA BOUNDARY |
| 1 | NEAREST TO BASE STATION |

Based on such information indicating location, a location recognizer 62 of a UE recognizes a parameter associated with the location of the UE. For example, the relationship between the bit values and the interpretations shown in any of Tables 1 to 3 is provided to the UE in advance. Based on the relationship provided, the location recognizer 62 can recognize the location of the UE from a bit value.

If the number of UEs that are multiplexed in NOMA is predetermined, UEs do not need to be notified of the number. However, if the number is variable, UEs (in particular, UEs that are not located nearest to the boundary of the cell area) need to be notified of the number. In this case, the information notifier 40 notifies each of the UEs that are connected to the base station 1 of information indicating the number through an upper-layer signal or a control channel signal.

In order for UEs that are not located nearest to the boundary of the cell area to demodulate a data signal, each of the UEs needs to be notified of information related to downlink transmission power for that UE. The information related to downlink transmission power may be information directly indicating the downlink transmission power $P_k$ for the UE, or may be information indicating the ratio of the downlink transmission power $P_k$ to the total downlink transmission power P. The information notifier 40 notifies each UE connected to the base station 1 of such information through an upper-layer signal or a control channel signal.

Figure 7:
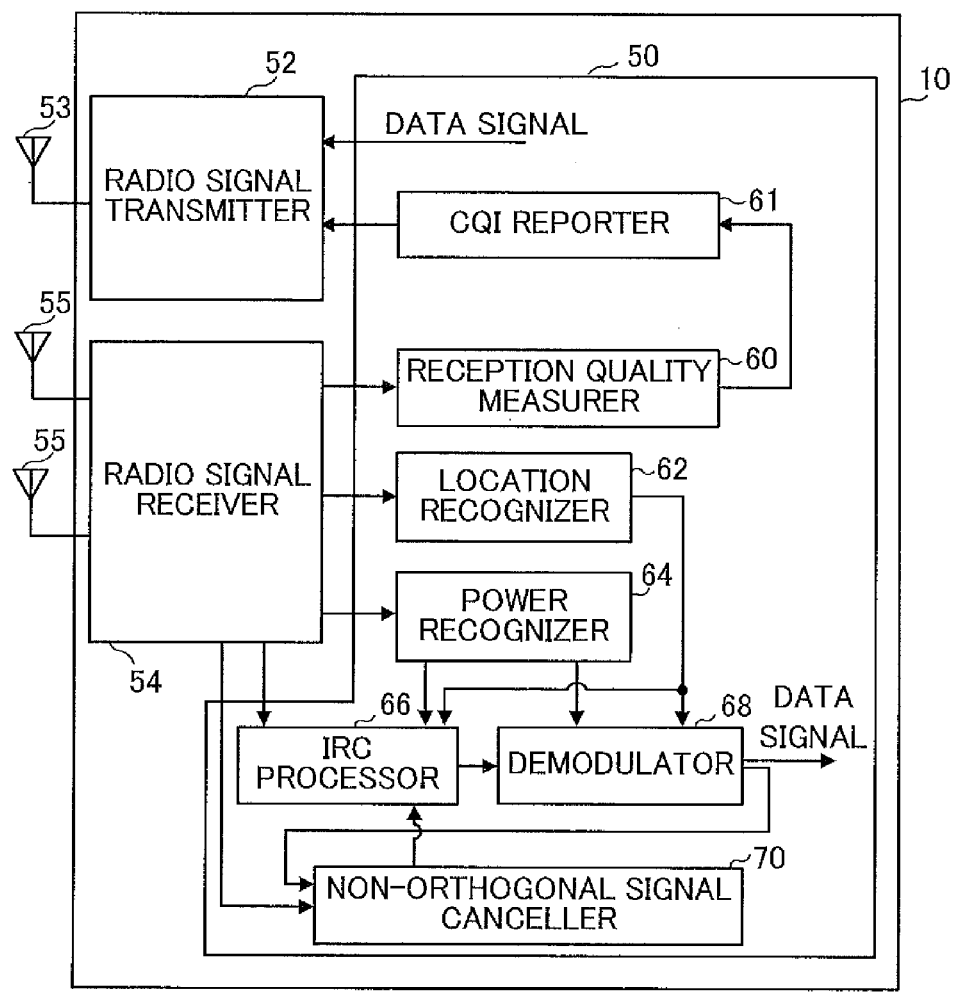
FIG. 7 is a block diagram illustrating a configuration of a user device according to the first embodiment of the present invention.

FIG. 7 is a block diagram illustrating a configuration of a UE 10 according to the first embodiment. The aforementioned UEs (such as UE 100) is configured in a manner similar to the UE 10. The UE 10 includes a controller 50, a radio signal transmitter 52, a transmitting antenna 53, a radio signal receiver 54, and multiple receiving antennae 55.

The radio signal transmitter 52 is a transmitting circuit that converts electrical signals into radio waves transmitted from the transmitting antenna 53 in order for the UE 10 to perform radio transmission to the desired base station. The radio signal receiver 54 is a receiving circuit that converts radio waves received from the receiving antennae 55 into electrical signals in order for the UE 10 to perform radio reception from the desired base station. The receiving antennae 55 constitute an adaptive antenna array.

The controller 50 includes a reception quality measurer 60, a CQI reporter 61, a location recognizer 62, a power recognizer 64, an interference rejection combining processor (IRC processor) 66, a demodulator 68, and a non-orthogonal signal canceller 70. The controller 50 is a CPU that operates in accordance with a computer program. The reception quality measurer 60, the CQI reporter 61, the location recognizer 62, the power recognizer 64, the IRC processor 66, the demodulator 68, and the non-orthogonal signal canceller 70 are functional blocks that are achieved by the controller 50 functioning in accordance with the computer program.

The controller 50 supplies an uplink data signal to the radio signal transmitter 52, and the radio signal transmitter 52 sends the uplink data signal to the desired base station via the transmitting antenna 53. The reception quality measurer 60 measures the SINR of a radio signal received by the radio signal receiver 54. The CQI reporter 61 generates a CQI based on the SINR and supplies the CQI to the radio signal transmitter 52. The radio signal transmitter 52 transmits the CQI to the desired base station through a control channel.

The radio signal receiver 54 receives, from the desired base station, a radio signal that includes non-orthogonal signals that are not orthogonal to each other. Additionally, the radio signal receiver 54 receives, from the desired base station, information indicating the location of the UE and information related to downlink transmission power for the UE. Furthermore, in a case in which the desired base station transmits information indicating the number of UEs that are multiplexed in NOMA, the radio signal receiver 54 receives, from the desired base station, the information indicating the number of UEs that are multiplexed in NOMA.

The location recognizer 62 recognizes, based on the information that indicates the location of the UE and is transmitted from the desired base station, a parameter associated with the location of the UE. The power recognizer 64 recognizes the downlink transmission power $P_k$ for the UE based on the information that is related to the downlink transmission power for the UE and is transmitted from the desired base station.

The IRC processor 66 suppresses an interference signal component received from an interfering base station to which the UE is not connected. The interference signal component is in a non-orthogonal signal in the radio signal received by the radio signal receiver 54. The demodulator 68 demodulates the non-orthogonal signal in which the interference signal component has been suppressed by the IRC processor 66. In a case in which the location recognizer 62 recognizes that the UE is located within the cell area of the desired base station and is not located nearest to the boundary of the cell area, the non-orthogonal signal canceller 70 cancels, from the radio signal, the non-orthogonal signal demodulated by the demodulator 68. The IRC processor 66, the demodulator 68, and the non-orthogonal signal canceller 70 operate differently according to the location of the UE within the cell area of the base station, the location being notified by the desired base station and recognized by the location recognizer 62.

In a case in which the location recognizer 62 recognizes that the UE is located farthest away from the desired base station (i.e., located nearest to the boundary of the cell area), the IRC processor 66 suppresses an interference signal component by IRC-weighting of a received signal received by the radio signal receiver 54. The demodulator 68 demodulates the received signal in which the interference signal component has been suppressed by IRC-weighting. A signal directed to the UE (i.e., a signal with the highest reception power) is therefore demodulated. That is, a data signal directed to the UE is obtained, and the process of demodulation ends. It is not necessary to demodulate and cancel a signal directed to another UE. In this case, the non-orthogonal signal canceller 70 does not operate.

The process of demodulation in a case in which the location recognizer 62 recognizes that the UE is located farthest away from the desired base station is as described above with reference to FIG. 5. In a case in which the UE is located farthest away from the desired base station, received signals $R_1(k)$ received by the radio signal receiver 54 are represented, for example, by Formula (2) below. The subscript (k) indicates a downlink resource; specifically, a frequency.

$$R_1(k)=H_1(k)\{P_0 s_0(k)+P_1 s_1(k)\}+H_{1Intercell}(k)s_{1Intercell}(k)+I_1(k)+N_1(k) \quad (2)$$

In Formula (2), $H_1(k)$ is a channel impulse matrix for downlink from the desired base station to the UE. Formula (2) is used in a case in which the number of UEs that are multiplexed in NOMA is 2 (i.e., in a case in which downlink transmission to two UEs is simultaneously performed using the same frequency). $P_0$ is downlink transmission power for the UE nearer to the desired base station, and $P_1$ is downlink transmission power for the UE farther from the desired base station (i.e., the UE that performs a demodulation process).

$s_0(k)$ is a vector of a transmission data signal directed to the UE nearer to the desired base station, and $s_1(k)$ is a vector of a transmission data signal directed to the UE farther from the desired base station.

$H_{1Intercell}(k)$ is a channel impulse matrix for downlink from an interfering base station that causes dominant interference with the UE to the UE, and $s_{1Intercell}(k)$ is a vector of a transmission data signal that causes interference with the UE from the interfering base station.

$I_1(k)$ is a matrix representing non-dominant interfering components, and $N_{1(k)}$ is a matrix representing thermal noise components.

An IRC-weighting matrix $W_{1(k)}$ for IRC weighting by the IRC processor 66 in a case in which the UE is located farthest away from the desired base station is represented, for example, by Formula (3) below. Formula (3) is used in a case in which the number of UEs that are multiplexed in NOMA is 2 (i.e., in a case in which downlink transmission to two UEs is simultaneously performed using the same frequency).

$$W_1(k) = \hat{H}_1^H(k)\big((P_0+P_1)\hat{H}_1(k)\hat{H}_1^H(k) + \quad (3)$$
$$P_{1Intercell}H_{1Intercell}(k)H_{1Intercell}^H(k) + (\sigma_{I1}^2 + \sigma_{N1}^2)I\big)^{-1}$$

In Formula (3), $\hat{H}_1(k)$ is an estimated channel impulse matrix for downlink from the desired base station to the UE. The superscript letter H indicates complex conjugate transpose. $P_{1Intercell}$ is transmission power of an interfering base station that causes dominant interference with the UE, $\sigma_{I1}^2$ is non-dominant interference power, and $\sigma_{N1}^2$ is thermal noise power. I is a unit matrix.

$P_0+P_1$ as used in Formula (3) is the total downlink transmission power P of the desired base station and is known to the UE (the total downlink transmission power P may be a fixed value, or the UE may be notified of the total downlink transmission power P from the desired base station through an upper-layer signal or a reference signal). Each of the other parameters is estimated by publicly known techniques. The IRC processor 66 of the UE located farthest away from the desired base station can therefore calculate an IRC-weighting matrix and can multiply a received signal by the IRC-weighting matrix. The IRC processor 66 does not need to know the downlink transmission power $P_1$ for the UE. The demodulator 68 of the UE located farthest away from the desired base station can obtain a data signal directed to the UE by simply demodulating the IRC-weighted received signal.

On the other hand, in a case in which the location recognizer 62 recognizes that the UE is located within the cell area of the desired base station and is not located nearest to the boundary of the cell area, the IRC processor 66 suppresses an interference signal component by IRC-weighting of a received signal received by the radio signal receiver 54, and the demodulator 68 demodulates the received signal in which the interference signal component has been suppressed by IRC-weighting. A signal directed to the UE located farthest away from the desired base station (i.e., a signal with the highest reception power) is therefore demodulated.

The non-orthogonal signal canceller 70 then cancels, from the radio signal, the non-orthogonal signal demodulated by the demodulator 68. Then, until the demodulator 68 demodulates a signal directed to its own UE, the IRC processor 66 suppresses an interference signal component in a non-orthogonal signal that is outputted from the non-orthogonal signal canceller 70, and the demodulator 68 demodulates the non-orthogonal signal in which the interference signal component has been suppressed by the IRC processor 66. That is, in this case, until the demodulator 68 demodulates the signal directed to its own UE, the UE repeats interference rejection combining and cancellation of a non-orthogonal signal directed to another UE connected to the desired base station.

The process of demodulation in a case in which the location recognizer 62 recognizes that the UE is located within the cell area of the desired base station and is not located nearest to the boundary of the cell area is as described above with reference to FIG. 4. In a case in which the UE is located within the cell area of the desired base station and is not located nearest to the boundary of the cell area, received signals $R_0(k)$ received by the radio signal receiver 54 are represented, for example, by Formula (4) below.

$$R_0(k)=H_0(k)\{P_0s_0(k)+P_1s_1(k)\}+H_{0Intercell}(k)s_{0Intercell}(k)+I_0(k)+N_0(k) \quad (4)$$

In Formula (4), $H_0(k)$ is a channel impulse matrix for downlink from the desired base station to the UE. Formula (4) is used in a case in which the number of UEs that are multiplexed in NOMA is 2 (i.e., in a case in which downlink transmission to two UEs is simultaneously performed using the same frequency). $P_0$ is downlink transmission power for the UE nearer to the desired base station (i.e., the UE that performs demodulation process), and $P_1$ is downlink transmission power for the UE farther from the desired base station (i.e., the other UE).

$H_{0Intercell}(k)$ is a channel impulse matrix for downlink from an interfering base station that causes dominant interference with the UE to the UE, and $s_{0Intercell}(k)$ is a vector of transmission data signal that causes interference with the UE from the interfering base station.

$I_0(k)$ is a matrix representing non-dominant interfering components, and $N_{0(k)}$ is a matrix representing thermal noise components.

An IRC-weighting matrix $W_{01(k)}$ for IRC-weighting that the IRC processor 66 performs first (i.e., the IRC weighting illustrated in the upper row in FIG. 4), in a case in which the UE is located within the cell area of the desired base station and is not located nearest to the boundary of the cell area, is represented, for example, by Formula (5) below. Formula (5) is used in a case in which the number of UEs that are multiplexed in NOMA is 2 (i.e., in a case in which downlink transmission to two UEs is simultaneously performed using the same frequency).

$$W_{01}(k) = \hat{H}_0^H(k)\big((P_0+P_1)\hat{H}_0(k)\hat{H}_0^H(k) + \quad (5)$$
$$P_{0Intercell}H_{0Intercell}(k)H_{0Intercell}^H(k) + (\sigma_{I0}^2 + \sigma_{N0}^2)I\big)^{-1}$$

In Formula (5), $\hat{H}_0(k)$ represents an estimated channel impulse matrix for downlink from the desired base station to the UE. $P_{0Intercell}$ is transmission power of an interfering base station that causes dominant interference with the UE, $\sigma_{I0}^2$ is non-dominant interference power, and $\sigma_{N0}^2$ is thermal noise power.

$P_0+P_1$ as used in Formula (5) is the total downlink transmission power P of the desired base station and is known to the UE. Each of the other parameters is estimated by publicly known techniques. The IRC processor 66 of the UE located near the desired base station can therefore calculate an IRC-weighting matrix according to Formula (5) and can multiply a received signal by the IRC-weighting matrix. The demodulator 68 of the UE located near the desired base station can obtain a data signal directed to a UE located farthest away from the desired base station by simply demodulating the IRC-weighted received signal.

The non-orthogonal signal canceller 70 then cancels, from the radio signal, the non-orthogonal signal demodulated by the demodulator 68 (i.e., a replica of the data signal directed to the UE located farthest away from the desired base station). The resulting signal $R_{02}(k)$ is represented, for example, by Formula (6) below.

$$R_{02}(k)=H_0(k)P_0s_0(k)+H_{0Intercell}(k)s_{0Intercell}(k)+I_0(k)+N_0(k) \quad (6)$$

Formula (6) is used in a case in which the number of UEs that are multiplexed in NOMA is 2 (i.e., in a case in which downlink transmission to two UEs is simultaneously performed using the same frequency). $P_0$ is downlink transmission power for the UE nearer to the desired base station (i.e., the UE that performs a demodulation process).

The IRC processor 66 suppresses an interference signal component in a non-orthogonal signal that is outputted from the non-orthogonal signal canceller 70 by IRC-weighting. An IRC-weighting matrix $W_{02(k)}$ for IRC-weighting that the IRC processor 66 performs second (i.e., the IRC weighting illustrated in the lower row in FIG. 4), in a case in which the UE is located within the cell area of the desired base station and is not located nearest to the boundary of the cell area, is represented, for example, by Formula (7) below. Formula (7) is used in a case in which the number of UEs that are multiplexed in NOMA is 2 (i.e., in a case in which downlink transmission to two UEs is simultaneously performed using the same frequency).

$$W_{02}(k) = \hat{H}_0^H(k)\left(P_0\hat{H}_0(k)\hat{H}_0^H(k) + P_{0Intercell}H_{0Intercell}(k)H_{0Intercell}^H(k) + (\sigma_{I0}^2 + \sigma_{N0}^2)I\right)^{-1} \quad (7)$$

$P_0$ as used in Formula (7) is downlink transmission power for the UE that performs a demodulation process and is recognized by the power recognizer 64. Each of the other parameters is estimated by publicly known techniques. The IRC processor 66 of the UE located near the desired base station can therefore calculate an IRC-weighting matrix according to Formula (7) and can multiply the signal $R_{02}(k)$ by the IRC-weighting matrix. The demodulator 68 of the UE located near the desired base station can obtain a data signal directed to its own UE from the desired base station by demodulating the IRC-weighted signal according to Formula (6). $P_0$ as used in Formula (6) is downlink transmission power for the UE that performs a demodulation process and is recognized by the power recognizer 64. Each of the other parameters is measured or estimated by publicly known techniques.

The foregoing has described how UEs specifically operate in a case in which the number of UEs that are multiplexed in NOMA is 2. One skilled in the art will understand, by making appropriate modifications to the foregoing description, how UEs specifically operate in a case in which the number of UEs that are multiplexed in NOMA is 3 or more.

As described above, the first embodiment achieves non-orthogonal multiple access in which a user device can execute interference rejection combining and appropriately process a radio signal that includes non-orthogonal signals. In particular, based on information transmitted from a desired base station, the user device can recognize the location of the user device, and based on the location, the user device can selectively execute interference rejection combining and appropriate processes for demodulation of the non-orthogonal signals.

Second Embodiment

Next, a second embodiment of the present invention will be described. A configuration of a base station according to the second embodiment may be similar to that of the base station 1 according to the first embodiment (see FIG. 6). In the first embodiment, the information notifier 40 notifies each of the UEs connected to the base station 1 of information indicating the location of that UE and notifies each of the UEs of information related to downlink transmission power for that UE. That is, the information notifier 40 notifies a UE separately of information indicating the location of the UE and information related to downlink transmission power for the UE.

In the second embodiment, however, the information notifier 40 of the base station does not notify each of the UEs connected to the base station 1 of information indicating the location of that UE, but notifies each of the UEs of information related to downlink transmission power for that UE. In NOMA, the greater the distance between a UE and a desired base station, the higher the downlink transmission power. A UE can therefore recognize the location of the UE; specifically, the UE can recognize the distance between the UE and the desired base station based on information related to downlink transmission power for the UE.

In a case in which the number of UEs that are multiplexed in NOMA is predetermined, UEs do not need to be notified of that number. However, in a case in which the number is variable, UEs (in particular, UEs that are not located nearest to the boundary of the cell area) need to be notified of the number. In this case, the information notifier 40 notifies each of the UEs connected to the base station 1 of information indicating the number using an upper-layer signal or a control channel signal.

Figure 8:
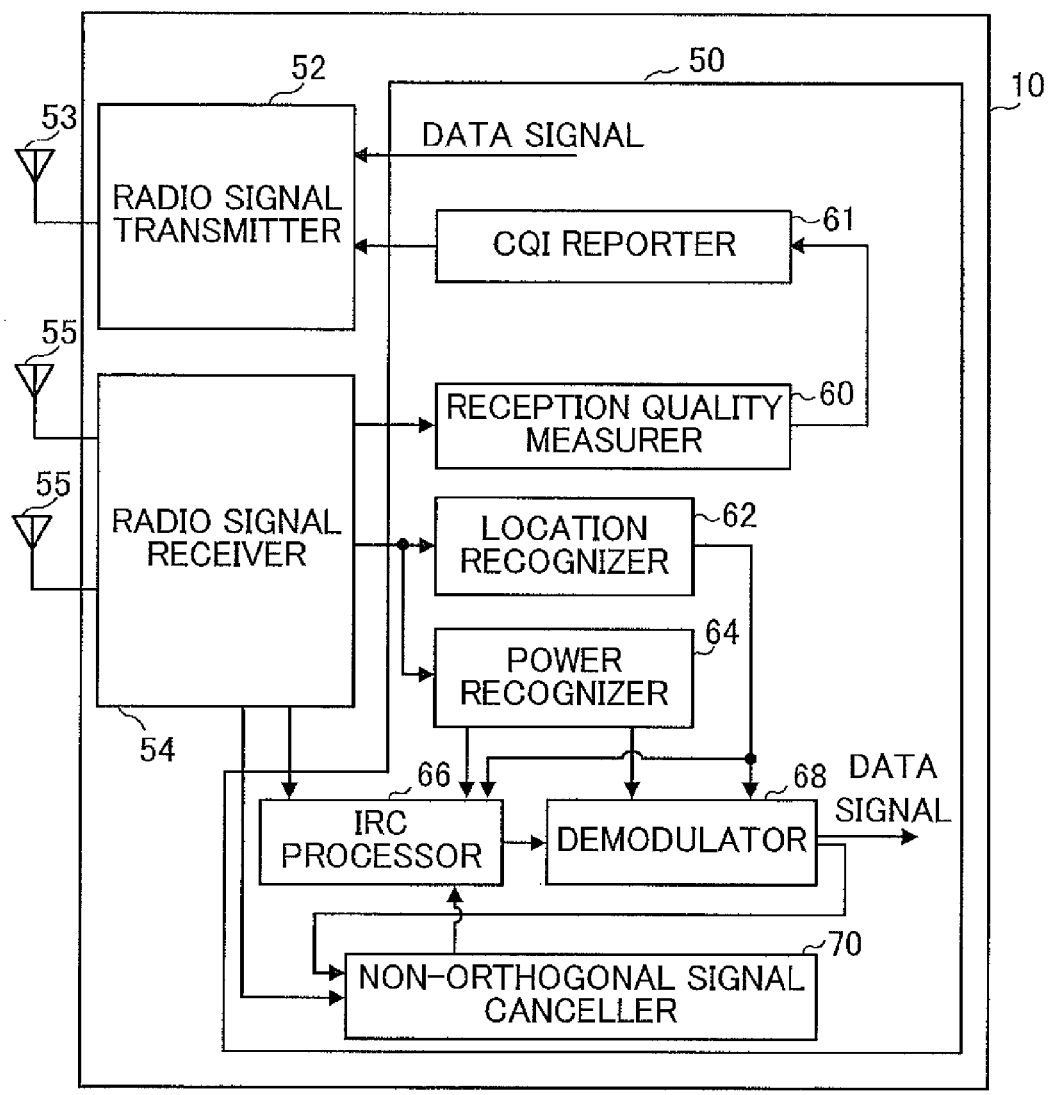
FIG. 8 is a block diagram illustrating a configuration of a user device according to a second embodiment of the present invention.

FIG. 8 is a block diagram illustrating a configuration of a UE 10 according to the second embodiment. Components of the UE according to the second embodiment may be similar to those of the UE according to the first embodiment (see FIG. 7), except that the location recognizer 62 recognizes, based on information that is transmitted from the desired base station and is related to downlink transmission power for the UE, a parameter associated with the location of the UE. As in the first embodiment, the power recognizer 64 recognizes the downlink transmission power $P_k$ for the UE based on the information that is transmitted from the desired base station and is related to downlink transmission power for the UE.

As in the first embodiment, in a case in which the location recognizer 62 recognizes that the UE is located within the cell area of the desired base station and is not located nearest to the boundary of the cell area, the IRC processor 66 of the UE uses the downlink transmission power recognized by the power recognizer 64 for IRC-weighting calculation for demodulating a signal directed to the UE. That is, in a case in which the UE is located within the cell area of the desired base station and is not located nearest to the boundary of the cell area, the IRC processor 66 suppresses an interference signal component on the basis of the downlink transmission power recognized by the power recognizer 64.

As in the first embodiment, in a case in which the location recognizer 62 recognizes that the UE is located within the cell area of the desired base station and is not located nearest to the boundary of the cell area, the demodulator 68 of the UE uses the downlink transmission power recognized by the power recognizer 64 to demodulate a signal directed to the UE. That is, in a case in which the UE is located within the cell area of the desired base station and is not located nearest to the boundary of the cell area, the demodulator 68 demodulates the signal directed to the UE on the basis of the downlink transmission power recognized by the power recognizer 64.

Information related to downlink transmission power of which the information notifier 40 of the base station 1 notifies the UE may be information directly indicating the downlink transmission power $P_k$ for the UE, or may be information indicating the ratio of the downlink transmission power $P_k$ to the total downlink transmission power P. Since the total downlink transmission power P of the desired base station is known to the UE, the power recognizer 64 of the UE can calculate the downlink transmission power $P_k$ for the UE from the information indicating the ratio.

The information notifier 40 of the base station 1 notifies the UE of information associated with downlink transmission power through an upper-layer signal or a control channel signal. For example, the information notifier 40 can use, as the information associated with downlink transmission power, a predetermined number of bits in a control channel. Table 4 shows an example of the information associated with downlink transmission power.

TABLE 4

| BIT FIELD | INTERPRETATION (POWER RATIO) | INTERPRETATION (LOCATION) |
|---|---|---|
| 00 | $P_0/P = 0.5$ | NEAREST TO CELL AREA BOUNDARY |
| 01 | $P_1/P = 0.3$ | SECOND NEAREST TO CELL AREA BOUNDARY |
| 10 | $P_2/P = 0.15$ | SECOND NEAREST TO BASE STATION |
| 11 | $P_3/P = 0.05$ | NEAREST TO BASE STATION |

Table 4 shows an example of a case in which the number of UEs to which the same frequency is simultaneously allocated (i.e., the number of UEs that are multiplexed in NOMA) is 4. Each of the UEs can recognize the downlink transmission power for the UE (in this example, the ratio of the downlink transmission power $P_k$ to the total downlink transmission power P) and the location of the UE with respect to the desired base station by interpreting two bits in a downlink control channel. The information associated with downlink transmission power can be considered as information indicating the location of the UE with respect to the desired base station, as well as information associated with downlink transmission power. In Table 4, the two-bit value 00 indicates maximum transmission power and that the UE is the nearest to the boundary of the cell area (cell area boundary), and the two-bit value 11 indicates minimum transmission power and that the UE is the nearest to the base station. However, the relationship between the bit values and the interpretations is not limited to this example.

The number of UEs that are multiplexed in NOMA is not limited to 4. Therefore, there can be different variations in the information associated with downlink transmission power. For example, in a case in which the number of UEs that are multiplexed in NOMA is 2, two-bit information as shown in Table 5 may be used, or one-bit information as shown in Table 6 may be used.

TABLE 5

| BIT FIELD | INTERPRETATION (POWER RATIO) | INTERPRETATION (LOCATION) |
|---|---|---|
| 00 | $P_0/P = 0.7$ | NEAREST TO CELL AREA BOUNDARY |
| 11 | $P_1/P = 0.3$ | NEAREST TO BASE STATION |

TABLE 6

| BIT FIELD | INTERPRETATION (POWER RATIO) | INTERPRETATION (LOCATION) |
|---|---|---|
| 0 | $P_0/P = 0.7$ | NEAREST TO CELL AREA BOUNDARY |
| 1 | $P_1/P = 0.3$ | NEAREST TO BASE STATION |

Based on such information indicating location and downlink transmission power, the location recognizer 62 of the UE recognizes the location of the UE, and the power recognizer 64 of the UE recognizes the downlink transmission power for the UE. For example, the relationship between the bit values and the interpretations shown in any of Tables 4 to 6 may be provided to the UE in advance. Based on this relationship, the location recognizer 62 can recognize the location of the UE from a bit value, and the power recognizer 64 can recognize the downlink transmission power for the UE from the bit value.

It is possible to update the relationship between information indicating downlink transmission power and the interpretations of the downlink transmission power by a UE. For example, in Table 4, the bits 00 indicate a power ratio of 0.5. Since the downlink transmission power determiner 42 of the base station 1 successively determines downlink transmission power according to, for example, Formula (1), the downlink transmission power determiner 42 may determine that the downlink transmission power for the UE located farthest away from the base station 1 takes on a value other than 0.5. The same applies to the downlink transmission power for other UEs. Therefore, it is preferable that the information notifier 40 of the base station 1 transmits, to UEs, information instructing the UEs to update the interpretations of the downlink transmission power. Table 7 shows an example of the information for instructing the UEs to update the interpretations of the downlink transmission power. Such information is notified from the base station 1 to the UEs through an upper-layer signal or a control channel signal. In a UE that has received such information, the power recognizer 64 interprets information indicating downlink transmission power according to the new interpretations and recognizes the downlink transmission power.

TABLE 7

| BIT FIELD | NEW INTERPRETATION (POWER RATIO) |
|---|---|
| 00 | $P_0/P = 0.53$ |
| 01 | $P_1/P = 0.25$ |
| 10 | $P_2/P = 0.14$ |
| 11 | $P_3/P = 0.08$ |

As with the first embodiment, the second embodiment enables a user device to recognize the location of the user device based on information transmitted from a desired base station, and based on the location, the user device selectively execute interference rejection combining and appropriate processes for demodulation of a non-orthogonal signal.

Furthermore, the second embodiment allows the user device to perform interference rejection combining and demodulation of a non-orthogonal signal with the use of information that is transmitted from the desired base station and is related to downlink transmission power. Moreover, a single type of information transmitted from the desired base station allows the user device to recognize the location of the user device and the downlink transmission power for the user device. The configuration according to the second embodiment can therefore reduce the amount of traffic compared with the configuration according to the first embodiment.

Third Embodiment

Next, a third embodiment of the present invention will be described. The third embodiment is a modification of the second embodiment. The information notifier 40 of the base station 1 notifies each UE of, as the information related to the location of the UE and to the downlink transmission power for the UE, information indicating a modulation and coding scheme (MCS) of a downlink data signal for the UE.

In order for a UE to demodulate a downlink data signal, the UE needs to know the MCS of the downlink data signal for the UE. Furthermore, in a case in which the UE is located within the cell area of the desired base station and is not located nearest to the boundary of the cell area (i.e., the power for the UE is lower than that of another UE that is multiplexed in NOMA), the UE needs to know the MCS for the other UE because the UE needs to demodulate a signal directed to the other UE (i.e., a signal with high power). Therefore, in the first and second embodiments, the information notifier 40 of the base station 1 notifies a UE of the MCS for the UE and also notifies the UE of the MCS for another UE for which higher power is allocated than the UE. In the third embodiment, however, MCS-indicating information, of which the base station 1 notifies the UE, is associated with the location of the UE related to the MCS and with the downlink transmission power for the UE. The term "associated" as used herein means that the UE can interpret the location of the UE and the downlink transmission power for the UE based on the MCS-indicating information transmitted from the base station 1.

A configuration of a base station according to the third embodiment may be similar to that of the base station 1 according to the first embodiment (see FIG. 6). A configuration of a UE according to the third embodiment may be similar to that of the UE 10 according to the second embodiment (see FIG. 8).

An MCS of which the information notifier 40 of the base station 1 notifies a UE may be directly associated with the downlink transmission power $P_k$ for the UE, or may be associated with the ratio of the downlink transmission power $P_k$ to the total downlink transmission power P. Since the total downlink transmission power P of the desired base station is known to the UE, the power recognizer 64 of the UE can calculate the downlink transmission power $P_k$ for the UE from the information indicating the ratio. Alternatively, the MCS may be associated with a relative value of downlink transmission power, which is described later, and the UE may calculate the downlink transmission power on the basis of the relative value. The MCS of which the information notifier 40 of the base station 1 notifies the UE may be directly associated with the location of the UE (i.e., a level of distance between the UE and the desired base station). The MCS may be associated with the relative value of downlink transmission power (described later), and the UE may interpret the location based on the relative value.

The location recognizer 62 of the UE recognizes, based on MCS-indicating information transmitted from the desired base station, a parameter associated with the location of the user device. The power recognizer 64 recognizes the downlink transmission power $P_k$ for the UE based on the MCS-indicating information transmitted from the desired base station.

As in the first embodiment, in a case in which the location recognizer 62 recognizes that the UE is located within the cell area of the desired base station and is not located nearest to the boundary of the cell area, the IRC processor 66 of the UE uses the downlink transmission power recognized by the power recognizer 64 to perform IRC-weighting calculation for demodulating a signal directed to the UE. That is, in a case in which the UE is located within the cell area of the desired base station and is not located nearest to the boundary of the cell area, the IRC processor 66 suppresses an interference signal component on the basis of the downlink transmission power recognized by the power recognizer 64.

As in the first embodiment, in a case in which the location recognizer 62 recognizes that the UE is located within the cell area of the desired base station and is not located nearest to the boundary of the cell area, the demodulator 68 of the UE uses the downlink transmission power recognized by the power recognizer 64 to demodulate a signal directed to the UE. That is, in a case in which the UE is located within the cell area of the desired base station and is not located nearest to the boundary of the cell area, the demodulator 68 demodulates the signal directed to the UE on the basis of the downlink transmission power recognized by the power recognizer 64.

The third embodiment can achieve effects similar to those achieved in the second embodiment. Moreover, MCS-indicating information transmitted from a base station allows a user device to recognize the location of the user device and the downlink transmission power for the user device. The amount of traffic can be reduced in the third embodiment compared with the second embodiment.

A particular example of the third embodiment is described below. Table 8 shows an example of a relationship between MCS-indicating information (MCS indices) and relative values of downlink transmission power.

TABLE 8

| MCS Index | INTERPRETATION (RELATIVE VALUE OF POWER) |
|---|---|
| 0 | 5 |
| 1 | 5 |
| 2 | 5 |
| 3 | 5 |
| 4 | 5 |
| 5 | 4 |
| 6 | 4 |
| 7 | 4 |
| 8 | 4 |
| 9 | 4 |
| 10 | 3 |
| 11 | 3 |
| 12 | 3 |
| 13 | 3 |
| 14 | 3 |
| 15 | 3 |
| 16 | 2 |
| 17 | 2 |
| 18 | 2 |
| 19 | 2 |
| 20 | 2 |
| 21 | 2 |

TABLE 8-continued

| MCS Index | INTERPRETATION (RELATIVE VALUE OF POWER) |
|---|---|
| 22 | 1 |
| 23 | 1 |
| 24 | 1 |
| 25 | 1 |
| 26 | 1 |
| 27 | 1 |
| 28 | 1 |
| 29 | reserved |
| 30 | |
| 31 | |

The relationship between the MCS indices and the interpretations illustrated in Table 8 is provided to UEs in advance. Based on this relationship, the UEs can recognize a relative value of downlink transmission power. In Table 8, the same relative value of transmission power is assigned to multiple MCS indices. Alternatively, different relative values may be assigned to different MCS indices.

The information notifier 40 of the base station 1 notifies multiple UEs that are multiplexed in NOMA of all MCS indices that are used for these UEs. The information notifier 40 also notifies each UE about which MCS is for that UE. The location recognizer 62 of a UE recognizes relative values of downlink transmission power for the UEs from these MCS indices and recognizes the location of the UE based on these relative values. The power recognizer 64 of the UE recognizes the relative values of downlink transmission power for the UEs from these MCS indices and calculates the downlink transmission power for the UE based on these relative values and the known total downlink transmission power P.

For example, let it be assumed that the number of UEs that are multiplexed in NOMA is 2 and that the base station 1 notifies each UE of MCS index 4 and MCS index 22. Let it be assumed that the UE located farthest away from the desired base station (i.e., located nearest to the boundary of the cell area) is assigned an MCS indicated by the MCS index 4 and the UE located nearest to the desired base station is assigned an MCS indicated by the MCS index 22. In this case, the UE located farthest away from the desired base station is assigned a relative value of power of 5, and the UE located nearest to the desired base station is assigned a relative value of power of 1. The total of the relative values is 6.

Since the number of the MCS indices that are transmitted from the desired base station is 2, the location recognizer 62 of each UE can recognize, based on the number of the MCS indices, the number of the UEs that are multiplexed in NOMA. The location recognizer 62 of each UE recognizes the relative values of downlink transmission power for the UEs (5 and 1) from these MCS indices (4 and 22), and recognizes the relative value of downlink transmission power for that UE (5 or 1) from the MCS index for that UE (4 or 22). If the relative value of downlink transmission power for the UE is higher than that of the downlink transmission power for the other UE, the location recognizer 62 recognizes that the UE is located farthest away from the desired base station. If the relative value of downlink transmission power for the UE is lower than that of the downlink transmission power for the other UE, the location recognizer 62 recognizes that the UE is nearest to the desired base station. Similarly, in a case in which the number of UEs that are multiplexed in NOMA is 3 or more, the location recognizer 62 can recognize the location of the UE (i.e., a level of distance between the UE and the desired base station) on the basis of a comparison between the number of MCS indices that are transmitted from the desired base station and the relative values.

The power recognizer 64 of each UE can recognize, based on the number of the MCS indices that are transmitted from the desired base station, the number of the UEs that are multiplexed in NOMA. The power recognizer 64 of each UE recognizes the relative values of downlink transmission power for the UEs (5 and 1) from these MCS indices (4 and 22), and recognizes the relative value of downlink transmission power for that UE (5 or 1) from the MCS index for that UE (4 or 22). Furthermore, the power recognizer 64 calculates the absolute value of downlink transmission power for the UE by multiplying the ratio of the relative value of downlink transmission power for the UE to the total of the relative values by the known total downlink transmission power P. More specifically, in a case in which the location recognizer 62 recognizes that the UE is located farthest away from the desired base station, the power recognizer 64 of the UE calculates the downlink transmission power $P_0$ for the UE according to the following formula.

$$P_0 = P*5/6$$

In a case in which the location recognizer 62 recognizes that the UE is nearest to the desired base station, the power recognizer 64 of the UE calculates the downlink transmission power $P_1$ for the UE according to the following formula.

$$P_1 = P*1/6$$

Similarly, in a case in which the number of UEs that are multiplexed in NOMA is 3 or more, the power recognizer 64 can calculate the absolute value of downlink transmission power for the UE on the basis of these relative values.

In this example, it is possible to update the relationship between the MCS indices and the interpretations of the relative values of downlink transmission power. Since the downlink transmission power determiner 42 of the base station 1 successively determines downlink transmission power according to, for example, Formula (1), the relationship illustrated in Table 8 may not necessarily be appropriate. Therefore, it is preferable that the information notifier 40 of the base station 1 transmits, to UEs, information instructing the UEs to update the interpretations of the MCS indices and the relative values of downlink transmission power. Table 9 shows an example of the information for instructing the UEs to update the interpretations of the relative values of downlink transmission power. Such information is notified from the base station 1 to the UEs through an upper-layer signal or a control channel signal. In a UE that has received such information, the power recognizer 64 recognizes the relative values of downlink transmission power according to the new interpretations.

TABLE 9

| MCS Index | NEW INTERPRETATION (RELATIVE VALUE OF POWER) |
|---|---|
| 0 | 6 |
| 1 | 6 |
| 2 | 5 |
| 3 | 5 |
| 4 | 4 |
| 5 | 4 |

TABLE 9-continued

| MCS Index | NEW INTERPRETATION (RELATIVE VALUE OF POWER) |
|---|---|
| 6 | 4 |
| 7 | 4 |
| 8 | 3 |
| 9 | 3 |
| 10 | 3 |
| 11 | 3 |
| 12 | 3 |
| 13 | 3 |
| 14 | 3 |
| 15 | 3 |
| 16 | 3 |
| 17 | 2 |
| 18 | 2 |
| 19 | 2 |
| 20 | 2 |
| 21 | 1 |
| 22 | 1 |
| 23 | 1 |
| 24 | 1 |
| 25 | 1 |
| 26 | 1 |
| 27 | 1 |
| 28 | 1 |
| 29 | reserved |
| 30 | |
| 31 | |

Fourth Embodiment

Next, a fourth embodiment of the present invention will be described. The fourth embodiment is a modification of the second embodiment. The information notifier 40 of the base station 1 uses a reference signal to notify each UE of the information related to the location of that UE and to the downlink transmission power for that UE. A configuration of a base station according to the fourth embodiment may be similar to that of the base station 1 according to the first embodiment (see FIG. 6). A configuration of a UE according to the fourth embodiment may be similar to that of the UE 10 according to the second embodiment (see FIG. 8).

The location recognizer 62 of the UE analyzes a reference signal transmitted from the desired base station and recognizes a parameter associated with the location of the UE. The power recognizer 64 of the UE analyzes the reference signal transmitted from the desired base station and recognizes the downlink transmission power $P_k$ for the UE. Schemes for transmitting reference signals include a scheme illustrated in FIG. 9 for transmitting a common reference signal and a scheme illustrated in FIG. 10 for transmitting dedicated reference signals.

Figure 9:
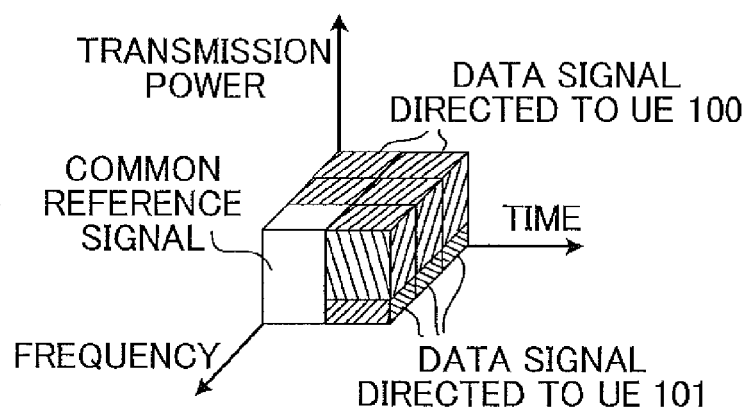
FIG. 9 is a schematic diagram illustrating an information transmission scheme according to an example of a fourth embodiment of the present invention.
Figure 10:
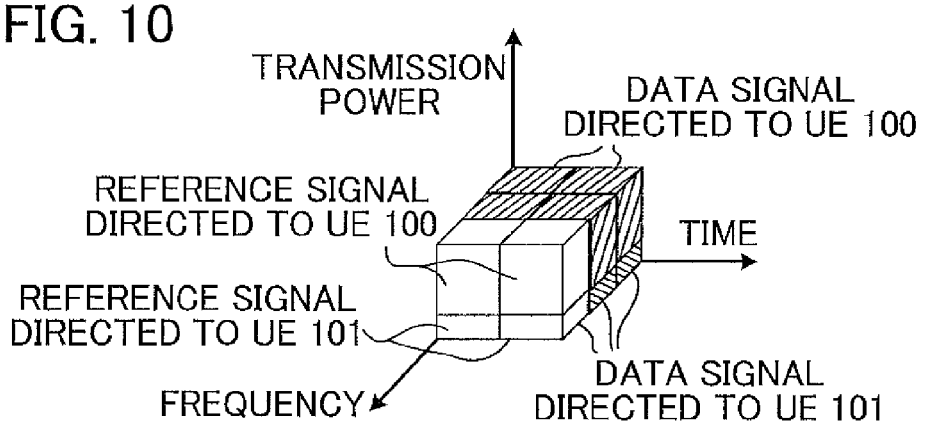
FIG. 10 is a schematic diagram illustrating an information transmission scheme according to another example of the fourth embodiment of the present invention.

FIGS. 9 and 10 show that a data signal that is directed to the UE 100 and is having high downlink transmission power and a data signal that is directed to the UE 101 and is having low downlink transmission power are multiplexed and are simultaneously transmitted using the same frequency according to NOMA. In the example illustrated in FIG. 9, the base station 1 simultaneously transmits, using the same frequency, a common reference signal with the downlink transmission power for the data signal directed to the UE 100 and with the downlink transmission power for the data signal directed to the UE 101. This allows the UE 100 to know the location of the UE 101 and the downlink transmission power for the UE 101 as well as the location of the UE 100 and the downlink transmission power for the UE 100, and allows the UE 101 to know the location of the UE 100 and the downlink transmission power for the UE 100 as well as the location of the UE 101 and the downlink transmission power for the UE 101.

In the example illustrated in FIG. 10, the base station 1 transmits a dedicated reference signal directed to the UE 100 using the downlink transmission power for the data signal for the UE 100 and transmits a dedicated reference signal directed to the UE 101 using the downlink transmission power for the data signal for the UE 101. The reference signal directed to the UE 100 and the reference signal directed to the UE 101 are therefore orthogonal to each other. This allows the UE 100 to know the location of the UE 100 alone and the downlink transmission power for the UE 100 alone, and allows the UE 101 to know the location of the UE 101 alone and the downlink transmission power for the UE 101 alone.

Fifth Embodiment

Next, a fifth embodiment of the present invention will be described. A configuration of a UE according to the fifth embodiment may be similar to that of the UE according to the first embodiment (see FIG. 7) or that of the UE 10 according to the second embodiment (see FIG. 8). Note, however, that the IRC processor 66 of each UE is a successive interference canceller (SIC). SICs are disclosed, for example, in the following documents:

S. Sen, N. Santhapuri, R. R. Choudhury, and S. Nelakuditi, "Successive interference cancellation: A back-of-the-envelope perspective," in Proc. Ninth ACM Workshop on Hot Topics in Networks (HotNets-IX), Monterey, Calif., Oct. 20-21, 2010.

Raphael Visoz et al., "Binary Versus Symbolic Performance Prediction Methods For Iterative MMSE-IC Multiuser MIMO Joint Decoding", in Proc. IEEE SPAWC, June 2009.

The SIC generates an interference replica by demodulating an interference signal component from an interfering base station (i.e., another base station near the desired base station) and successively subtracts the interference replica from a radio signal. This process makes it possible to suppress interference. In order for a UE to demodulate an interference signal component, the UE needs to know the MCS same as that used to demodulate a signal by a UE connected to the interfering base station. Furthermore, in a case in which the interfering base station also adopts NOMA, in order for the subject UE to demodulate an interference signal component, the subject UE needs to know the downlink transmission power for a UE, among from UEs to which the interfering base station is performing downlink transmission according to NOMA using the same frequency as that used for a signal to the subject UE, to which UE the interfering base station has allocated highest downlink transmission power (it is preferable that the subject UE knows all of the downlink transmission powers for the UEs to which the interfering base station is performing downlink transmission according to NOMA using the same frequency as that used for a signal to the subject UE).

In light of the situation described above, in the fifth embodiment, each base station notifies a neighboring base station of information related to downlink transmission power that the base station uses for downlink transmission. Each base station then notifies UEs connected to that base station of other-base-station power information that is received from the neighboring base station and is related to the downlink transmission power used by the neighboring base station for downlink transmission.

FIG. 11 is a block diagram illustrating a configuration of a base station 1 according to the fifth embodiment. Components of the base station 1 according to the fifth embodiment may be similar to those of the base station 1 according to the first embodiment (see FIG. 6). The base station 1 according to the fifth embodiment operates in a manner similar to the base station according to any of the first to fourth embodiments. After determining downlink transmission powers for UEs that use this base station as the desired base station, the downlink transmission power determiner 42 notifies a neighboring base station of information indicating these downlink transmission powers via the inter-base-station communicator 36. The downlink transmission power determiner 42 may notify the neighboring base station of information indicating only the highest downlink transmission power among from the downlink transmission powers.

The inter-base-station communicator 36 receives, from a neighboring base station, information related to downlink transmission power that the neighboring base station uses for downlink transmission. Based on this information, the information notifier 40 generates other-base-station power information related to the downlink transmission power that the neighboring base station uses for downlink transmission. The information notifier 40 serves as an other-base-station power information notifier to notify UEs connected to the base station of the other-base-station power information through an upper-layer signal or a control channel. In a format similar to that in the third embodiment, the information notifier 40 may notify each UE of information indicating the MCS used by an interfering base station as the other-base-station power information, and each UE may recognize, from the MCS used by the interfering base station, downlink transmission power used by the interfering base station.

In a UE that has received the other-base-station power information, the IRC processor 66 (i.e., the SIC) recognizes downlink transmission power used by the interfering base station, generates an interference replica on the basis of the downlink transmission power, and executes interference suppression by subtracting the interference replica from a radio signal. Other operations are similar to those in any of the first to fourth embodiments.

In the fifth embodiment, the IRC processor of a user device is a SIC. In a case in which an interfering base station executes NOMA, the SIC properly operates, and therefore, the user device can demodulate a desired data signal.

Another Modification

Each of the functions that the CPUs execute in a base station and a UE may instead be executed by hardware, or may be executed by a programmable logic device such as an FPGA (field programmable gate array) and a DSP (digital signal processor).

The aforementioned embodiments and modification may be combined, as long as they do not conflict with each other.

DESCRIPTION OF REFERENCE SIGNS 1, 2 . . . base station,
1a, 2a . . . cell area,
10, 100, 101, 102 . . . UE (user device),
30 . . . controller,
32 . . . radio signal transmitter,
33 . . . transmitting antenna,
34 . . . radio signal receiver,
35 . . . receiving antenna,
36 . . . inter-base-station communicator,
38 . . . CQI report processor,
40 . . . information notifier (other-base-station power information notifier),
42 . . . downlink transmission power determiner,
50 . . . controller,
52 . . . radio signal transmitter,
53 . . . transmitting antenna,
54 . . . radio signal receiver,
55 . . . receiving antenna,
60 . . . reception quality measurer,
61 . . . CQI reporter,
62 . . . location recognizer,
64 . . . power recognizer,
66 . . . interference rejection combining processor (IRC processor),
68 . . . demodulator, and
70 . . . non-orthogonal signal canceller.

The invention claimed is:

1. A radio communication system comprising:
base stations; and
user devices,
each base station including:
a downlink transmission power determiner configured to determine, based on parameters associated with locations of user devices connected to the base station, downlink transmission power for downlink transmission to each of the user devices connected to the base station;
a radio signal transmitter configured to transmit a radio signal in which a plurality of non-orthogonal signals are mixed, each of the plurality of non-orthogonal signals being transmitted with the corresponding downlink transmission power determined by the downlink transmission power determiner, each of the plurality of non-orthogonal signals being directed to a corresponding one of the user devices connected to the base station; and
an information notifier configured to notify each of the user devices connected to the base station of information associated with at least one of a location of the user device and the downlink transmission power for the user device,
each user device including:
a radio signal receiver configured to receive, from a desired base station to which the user device is connected, a radio signal including the plurality of non-orthogonal signals;
an interference rejection combining processor configured to suppress an interference signal component received from an interfering base station to which the user device is not connected, the interference signal component being in one of the plurality of non-orthogonal signals in the radio signal received by the radio signal receiver;
a demodulator configured to demodulate the one of the plurality of non-orthogonal signals in which the interference signal component has been suppressed by the interference rejection combining processor;
a location recognizer configured to recognize, based on the information transmitted from the desired base station, a parameter associated with the location of the user device; and
a non-orthogonal signal canceller configured to, when the location recognizer recognizes that the user device is located within a cell area of the desired base station and is not located nearest to a boundary of the cell area, cancel, from the radio signal, the one of the plurality of non-orthogonal signals demodulated by the demodulator, wherein:

when the location recognizer recognizes that the user device is located within the cell area of the desired base station and is located nearest to the boundary of the cell area, the demodulator demodulates, as a signal directed to the user device, the radio signal in which the interference signal component has been suppressed by the interference rejection combining processor, and the non-orthogonal signal canceller does not operate; and when the location recognizer recognizes that the user device is located within the cell area of the desired base station and is not located nearest to the boundary of the cell area, until the demodulator demodulates the signal directed to the user device, the interference rejection combining processor suppresses an interference signal component in the one of the plurality of non-orthogonal signals outputted from the non-orthogonal signal canceller and the demodulator demodulates the one of the plurality of non-orthogonal signals in which the interference signal component has been suppressed by the interference rejection combining processor.

2. The radio communication system according to claim 1, wherein the information notifier of each base station notifies each of the user devices connected to the base station of information related to the downlink transmission power for the user device, wherein each user device further includes a power recognizer configured to recognize the downlink transmission power for the user device based on the information related to the downlink transmission power for the user device, wherein the location recognizer of each user device recognizes, based on the information related to the downlink transmission power for the user device, the parameter associated with the location of the user device, wherein the interference rejection combining processor of each user device suppresses the interference signal component based on the downlink transmission power recognized by the power recognizer, and wherein the demodulator of each user device demodulates, based on the downlink transmission power recognized by the power recognizer, the signal directed to the user device.

3. The radio communication system according to claim 2, wherein the information notifier of each base station notifies each of the user devices connected to the base station, as the information related to the downlink transmission power for the user device, of information indicating a modulation and coding scheme of a downlink signal for the user device, and wherein the information indicating the modulation and coding scheme is associated with the location of the user device and with the downlink transmission power for the user device.

4. The radio communication system according to claim 1, wherein the interference rejection combining processor of each user device is a successive interference canceller configured to generate an interference replica by demodulating an interference signal component and subtracts the interference replica from the radio signal, wherein each base station further includes an other-base-station power information notifier configured to notify the user devices connected to the base station of other-base-station power information related to downlink transmission power used for downlink transmission by other base station neighboring to the base station, and wherein the interference rejection combining processor generates the interference replica based on the other-base-station power information.

5. A user device configured to communicate with a desired base station, the user device comprising:

a radio signal receiver configured to receive, from the desired base station, a radio signal in which a plurality of non-orthogonal signals are mixed, each of the plurality of non-orthogonal signals being directed to a corresponding one of user devices connected to the desired base station, the plurality of non-orthogonal signals being different in power based on parameters associated with locations of the user devices connected to the desired base station;

an interference rejection combining processor configured to suppress an interference signal component received from an interfering base station to which the user device is not connected, the interference signal component being in one of the plurality of non-orthogonal signals in the radio signal received by the radio signal receiver;

a demodulator configured to demodulate the one of the plurality of non-orthogonal signals in which the interference signal component has been suppressed by the interference rejection combining processor;

a location recognizer configured to recognize, based on information transmitted from the desired base station, a parameter associated with a location of the user device, the information being associated with at least one of the location of the user device and downlink transmission power for the user device; and a non-orthogonal signal canceller configured to, when the location recognizer recognizes that the user device is located within a cell area of the desired base station and is not located nearest to a boundary of the cell area, cancel, from the radio signal, the one of the plurality of non-orthogonal signals demodulated by the demodulator, wherein:

when the location recognizer recognizes that the user device is located within the cell area of the desired base station and is located nearest to the boundary of the cell area, the demodulator demodulates, as a signal directed to the user device, the radio signal in which the interference signal component has been suppressed by the interference rejection combining processor, and the non-orthogonal signal canceller does not operate; and when the location recognizer recognizes that the user device is located within the cell area of the desired base station and is not located nearest to the boundary of the cell area, until the demodulator demodulates the signal directed to the user device, the interference rejection combining processor suppresses an interference signal component in the one of the plurality of non-orthogonal signals outputted from the non-orthogonal signal canceller and the demodulator demodulates the one of the plurality of non-orthogonal signals in which the interference signal component has been suppressed by the interference rejection combining processor.

6. The user device according to claim 5, further including a power recognizer configured to recognize the downlink transmission power for the user device based on information related to the downlink transmission power for the user device and is transmitted from the desired base station, wherein the location recognizer recognizes, based on the information related to the downlink transmission power for the user device, the parameter associated with the location of the user device, wherein the interference rejection combining processor suppresses the interference signal component based on the downlink transmission power recognized by the power recognizer, and wherein the demodulator demodulates, based on the downlink transmission power recognized by the power recognizer, the signal directed to the user device.

7. The user device according to claim 6, wherein the user device receives from the desired base station, as the information related to the downlink transmission power for the user device, information indicating a modulation and coding scheme of a downlink signal for the user device, and wherein the information indicating the modulation and coding scheme is associated with the location of the user device and with the downlink transmission power for the user device.

8. The user device according to claim 5, wherein the interference rejection combining processor is a successive interference canceller configured to generate an interference replica by demodulating an interference signal component and subtracts the interference replica from the radio signal, and wherein the interference rejection combining processor generates the interference replica based on other-base-station power information transmitted from the desired base station and is related to downlink transmission power used for downlink transmission by other base station neighboring to the desired base station.

\* \* \* \* \*